US006355359B1

(12) United States Patent
Sukhadia et al.

(10) Patent No.: US 6,355,359 B1
(45) Date of Patent: Mar. 12, 2002

(54) POLYETHYLENE FILM

(75) Inventors: Ashish M. Sukhadia; William R. Coutant; Jim D. Byers; Louis Moore, Jr.; M. Bruce Welch; Syriac J. Palackal; Kiplin D. Cowan; David C. Rohlfing; Jay Janzen; Paul J. DesLauriers; William M. Whitte, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/702,908

(22) Filed: Oct. 31, 2000

Related U.S. Application Data

(60) Division of application No. 09/000,173, filed as application No. PCT/US96/13000 on Aug. 8, 1996, now Pat. No. 6,214,469, which is a continuation-in-part of application No. 08/515,498, filed on Aug. 15, 1995, now abandoned.

(51) Int. Cl.⁷ ....................... C08F 110/02; C08G 23/06; B32B 27/00

(52) U.S. Cl. ....................................................... 428/523
(58) Field of Search ................................. 428/523, 500, 428/516

(56) References Cited

U.S. PATENT DOCUMENTS

| 5,225,257 A | * | 7/1993 | Brant |
| 5,272,326 A | * | 12/1993 | Lai |
| 5,288,531 A | * | 2/1994 | Falla |
| 5,436,305 A | * | 7/1995 | Alt |
| 5,527,608 A | * | 6/1996 | Kemp-Patchett |

* cited by examiner

Primary Examiner—Christopher Henderson
(74) Attorney, Agent, or Firm—Edward L. Bowman

(57) ABSTRACT

A self supporting film having one or more layers wherein at least one layer has a percent haze of less than 17.8 and the polymer of that layer consists essentially of a polyethylene having a density of at least 0.925 grams per cc, a molecular weight distribution of no more than 4, optionally containing a fluoroelastomer, and methods for making such film are disclosed.

20 Claims, No Drawings

POLYETHYLENE FILM

This application is a divisional of U.S. patent application Ser. No. 09/000,173 filed Jan. 15, 1998 now U.S. Pat. No. 6,214,469 which is a 371 of PCT/US96/1300 filed Aug. 8, 1996 which was a Continuation-in-Part of U.S. patent application Ser. No. 08/515,498 filed Aug. 15, 1995, now abandoned the disclosure of which is incorporated herein by reference.

FIELD OF THE INVENTION

This invention relates to film of polymers produced from a monomer consisting essentially of ethylene. In another aspect, the present invention relates to polyethylene film having a good balance of physical, processing, and optical properties.

BACKGROUND OF THE INVENTION

In its broadest sense, the term "film" as used herein refers to self-supporting materials having a wide range of thicknesses. Examples would include thicknesses in the range of 0.05 to about 40 mils, more typically about 0.25 to about 5 mils (1 mil equals 1/1000 of an inch). Films can be made using a variety of techniques such as casting, blowing, and extrusion.

Good clarity in polyethylene blown film as indicated by low Haze and high Gloss has been noted in the past to be dependent upon several factors. Typically the Haze increases (and the Gloss decreases) as the polymer density and molecular weight distribution increases. Also, it has been noted that typically the surface roughness increases as the molecular weight distribution and density increases. Film stiffness on the other hand, which is often a desired property of the blown film dependent upon the actual application, has been noted to increase as density increases. Therefore, there has usually been a trade-off between film clarity and stiffness in polyethylene blown film.

Often in forming multi-layered films, a base layer of high molecular weight high density polyethylene or medium molecular weight high density weight polyethylene has been employed to provide strength and a low density polyethylene or linear low density polyethylene layer has been provided to provide other properties. Often, however, it has been noted that the low density polyethylene and linear low density polyethylene layers are tacky and sticky unless antiblock agents are included. Such antiblock agents, however, generally also have an adverse effect upon the clarity and physical properties.

An object of the present invention is to provide a method for producing films of ethylene polymers having a density of at least about 0.925 g/cc which have a good balance of processing, physical, and optical properties.

Other aspects, objects, and advantages of the present invention will be apparent from the following comments.

SUMMARY OF THE INVENTION

In accordance with the present invention, there is provided a unusually clear self-supporting film comprising at least one layer having a percent haze of less than 17.8 wherein the polymer of said layer consists essentially of polyethylene having a density of at least about 0.925 g/cc and a molecular weight distribution of no more than 4. The narrow molecular weight polyethylene having a density of at least about 0.925 g/cc is preferably selected from polyethylenes which can be formed into a 1 mil blown film having a percent haze of less than 17.8, or most preferably no more than 10.

In one preferred embodiment the film has only one layer of polymer consisting essentially of polyethylene having a density in the range of 0.93 to about 0.945 g/cc and a molecular weight distribution in the range of about 1.5 to about 4, or more preferably about 1.5 to about 3.5. In another preferred embodiment the film is multilayered and at least one layer has a percent haze of less than 17.8, more preferably a percent haze of less than 10, and comprises polyethylene having a density of at least 0.925 g/cc and a molecular weight distribution no more than 4.

DETAILED DESCRIPTION OF THE INVENTION

The polyethylene useful for producing the inventive films can be produced using a suitable metallocene-containing polymerization catalyst system. In a particularly preferred embodiment the polyethylene is produced in a slurry, i.e. particle form, type process wherein the polymer is formed under conditions such that the polymer is produced in the form of solid particles that can be readily separated from the liquid polymerization diluent. In such particle form polymerizations it is preferable that the metallocene-containing catalyst system be employed in a form that is substantially insoluble in the polymerization diluent during the polymerization process. Various techniques are known for producing such relatively insoluble catalyst systems. Some examples are shown in U.S. Pat. Nos. 5,354,721; 5,411,925; and 5,414,180.

One particularly preferred type of relatively insoluble solid metallocene catalyst system can be produced by prepolymerizing a mixture of a metallocene, preferably a metallocene having olefinically unsaturated substituents, and a suitable cocatalyst in the presence of an olefin, generally containing 2 to 8 carbon atoms. In particularly preferred embodiment the solid catalyst system is obtained by polymerizing ethylene in the presence of an alkane liquid diluent under slurry polymerization conditions using a special type of metallocene-based catalyst system. The catalyst system is a solid catalyst prepared by (a) combining 5-(9-fluorenyl)-5-(cyclopentadienyl)-hexene-1 zirconium dichloride and methylaluminoxane in a liquid, (b) prepolymerizing ethylene in the resulting liquid, and (c) separating the resulting solid prepolymerized catalyst system from the liquid. It is preferred that the liquid employed in step (a) be an organic liquid in which the methylaluminoxane is at least partially soluble. Preferably some aromatic solvent is employed in step (a). Examples of aromatic solvents include benzene, toluene, ethylbenzene, diethylbenzene, and the like. Preferably the amount of the liquid should be such as to dissolve the product of reaction between the metallocene and the aluminoxane, provide desirable polymerization viscosity for the polymerization, and to permit good mixing. During the mixing, the temperature would preferably be kept below that which would cause the metallocene to decompose. Typically the temperature would be in the range of about −50° C. to about 150° C. Preferably, the metallocene, the aluminoxane, and the liquid diluent are combined at room temperature, i.e. around 10° C. to 30° C. The reaction between the aluminoxane and the metallocene is relatively rapid. The reaction rate can vary over a wide range, however, it is generally desired that they be contacted for an amount of time in the range of about 1 minute to about 1 hour.

It is also within the scope of the invention to carry out the step (a) in the presence of a particulate solid. Any number of particulate solids can be employed. Typically this solid would be any inorganic solid that does not interfere with the desired end results. Examples include porous supports such as talc, inorganic oxides, resins to support material such as particulate polyolefins. Examples of inorganic oxide materials include metal oxides of Groups II–V, such as silica, alumina, silica-alumina, and mixtures thereof. Other examples of inorganic oxides are magnesia, titania, zirconia, and the like.

If a solid is employed, it is generally desirable for the solid to be thoroughly dehydrated prior to use. Preferably it is dehydrated so as to contain less than 1 percent loss on ignition. Thermal dehydration may be carried out in a vacuum or while purging with a dry inert gas such as nitrogen at a temperature of about 20° C. to about 1000° C. and preferably from about 300° C. to about 870° C. Pressure considerations are not viewed as critical. The duration of the thermal treatment can be from about 1 to about 24 hours as needed.

Dehydration can also be accomplished by subjecting the solid to a chemical treatment in order to remove water and reduce the concentration of surface hydroxyl groups. Chemical treatment is generally capable of converting all water hydroxyl groups in the oxide surface to relatively inert species. Useful chemical agents are for example, carbon monoxide, carbonyl sulfide, trimethylaluminum, ethyl magnesium chloride, chloro silanes such as $SiCl_4$, disilazane, trimethylchlorosilane, dimethylamino trimethylsilane, and the like.

The amount of aluminoxane and metallocene used in forming a liquid catalyst system for the prepolymerization can vary over a wide range. Typically, however, the molar ratio of the aluminum in the aluminoxane to the transition metal of the metallocene is in the range of about 1:1 to about 20,000:1, more preferably a molar ratio of about 50:1 to about 2,000:1 is used. If a particulate solid, i.e. silica, is used, generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or gel in a liquid. A wide range of olefins can be used for the polymerization. Typically, however, the prepolymerization will be conducted using an olefin, preferably selected from ethylene and non-aromatic alpha olefins, such as propylene. It is within the scope of the invention to use a mixture of olefins, for example, ethylene and a higher alpha olefin can be used for the prepolymerization. The use of a higher alpha olefin, such as 1-butene, with ethylene, is believed to increase the amount of copolymerization occurring between the olefin monomer and the olefinically unsaturated portion of the metallocene.

The prepolymerization can be conducted under relatively mild conditions. Typically this would involve using low pressures of the olefin and relatively low temperatures designed to prevent site decomposition resulting from high concentrations of localized heat. The prepolymerization typically occurs at temperatures in the range of about −15° C. to about +150° C., more typically in the range of about 0° C. to about +30° C. The amount of prepolymer can be varied but typically would be in the range of from about 1 to about 95 weight percent of the resulting prepolymerized solid catalyst system, still more preferably about 5 to about 80 weight percent. It is generally desirable to carry out the prepolymerization to at least a point where substantially all of the metallocene is in the solid rather than in the liquid, since that maximizes the use of the metallocene.

After the prepolymerization, the resulting solid prepolymerized catalyst is separated from the liquid reaction mixture. Various techniques known in the art can be used for carrying out this step. For example, the material could be separated by filtration, decantation, or vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from a liquid, the resulting solid is preferably washed with a hydrocarbon and dried using a high vacuum to remove substantially all the liquids or other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by a wash with a paraffinic hydrocarbon, such as hexane, and then the vacuum drying.

It is also within the scope of the present invention to add a particulate solid to the liquid catalyst system after it has been formed and then to carry out the prepolymerization in the presence of that solid. Another option is to add a particulate solid of the type aforementioned after the prepolymerization or after the solid prepolymerized catalyst system has been separated from the liquid.

This resulting solid prepolymerized catalyst system is capable of preparing polymers of ethylene having a fairly wide range of densities. Typically, in preparing the lower density versions, the ethylene is polymerized in combination with a smaller amount, generally less than 20 mole percent, of at least one other alpha olefin, generally containing about 3 to about 10 carbon atoms, examples of which include aliphatic hydrocarbons such as butene-1, pentene-1, hexene-1, 4-methylpentene-1, octene-1, and the like. The solid prepolymerized catalyst system can be employed using slurry polymerization conditions. Typically the polymerization temperature would be selected so as to provide slurry polymerization conditions in the particular liquid diluent selected. Typically the temperature would be in the range of about 20° C. to about 130° C. With isobutane as the liquid diluent, temperatures in the range of about 60° C. to about 110° C. have been found desirable. For producing polymers for film applications, it is generally desirable to produce a polymer having a melt index of less than 5. This can be accomplished by adjusting the molar ratio of hydrogen to ethylene in the polymerization process, changing the reactor temperature, and/or changing the ethylene concentration.

When the polymerization is carried out in a continuous loop slurry process, it is generally desirable to include in the reaction mixture a small amount of an antistatic agent. An example of such as antistatic agent is the material sold by DuPont Chemical Co. under the trade name Stadis 450.

In a particle form type polymerization the above described type of catalyst system is capable of producing polyethylene homopolymers and copolymers having densities of 0.925 g/cm or higher with molecular weight distributions of no more than 4 that are useful for making films having percent haze of less than 17.8, especially preferred polyethylenes having densities in the range of 0.925 to 0.95g/cc. The polymers produced in that manner have low flow activation energies, i.e. below about 25 kJ/mole, anda critical shear stress at the onset of melt fracture of less than $4 \times 10^6$ dyne/$cm^2$. This is considered to indicate that the polymers are substantially linear polymers substantially free of long chain branching. The number of long chain branches in such polymers is considered to be less than 0.01/1000 carbon atoms. The term "long chain branching" as used herein refers to branches having a chain length of at least 6 carbon atoms. A method of determining long chain branching is disclosed in Randal, *Rev. Macromol. Chem. Phys.*, C29 (243), 285–297.

The ethylene polymers produced in a particle form process with that catalyst system are also believed to have a very uniform distribution of short chain branches both at the intramolecular level (monomer sequence distributions along the chain) and at the intermolecular level (monomer distribution between polymer chains of different molecular weights). Homopolymers and ethylene-hexene copolymers produced with such catalysts are particularly unusual in that they contain ethylene branches even though no butene comonomer was employed in the polymerization. It is theorized that butene is formed insitu in the polymerization and that such results in a very uniform distribution of the ethylene branches. The shear stress response of such polymers is essentially independent of the molecular weight distribution.

It is typically desirable to add stabilizers to the polymer recovered from the polymerization process. A number of suitable stabilization packages are known in the art. Stabilizers can be incorporated into the polymer during a pelletization step or by reextrusion of previously produced pellets. One example of a stabilizer would be Irganox® 1010 antioxidant which is believed to be a hindered polyphenol stabilizer containing tetrakis [methylene 3-(3,5-di tertbutyl-4-hydroxy-phenylpropionate)] methane produced by Ciba-Geigy Corporation. Another example is the PEP-Q® additive which is a product of Sandoz Chemical, the primary ingredient of which is believed to be tetrakis-(2,4-di-tertbutyl-phenyl)-4,4' biphenyl phosphonite. Other common stabilizer additives include calcium stearate or zinc stearate. Still other stabilizers commonly used include Ultranox 626 antioxidant which is a product of GE, the primary ingredient of which is believed to be bis(2,4-di-t-butylphenyl) pentaerythritol diphosphite, and Ultranox 627A antioxidant which is believed to be Ultranox 626 containing about 7 weight percent of a magnesium aluminum hydrocarbonate. Such stabilizer additives can be employed in generally any suitable amount. The amounts used are generally the same as have been used for other polyethylene polymers. Often the amounts for each additive is less than 0.2 weight percent based upon the weight of the polymer.

The molecular weight of the polyethylene used to make the inventive film can vary over a wide range. Typically for forming films by blowing it is desirable for the polymer to have a melt index in the range of about 0.1–10 dg/min, more preferably about 0.2–5 dg/min. Generally if the melt index of the polymer is less than about 1, it is often desirable to incorporate a processing enhancing amount of a fluoroelastomer processing aid. One example is the fluoroelastomer sold under the trade name Viton by E. I. DuPont de Nemours & Co. Another example is the fluoropolymer sold under the trade name Dynamar FX-9613 by 3M Company. The amount of fluoropolymer employed can vary over a wide range depending upon the particular results desired. Typically it would be employed in an amount in the range of about 0.01 to about 1 weight percent based upon the weight of the polyethylene. In some cases the fluoroelastomer is employed in form of a masterbatch in which the fluoroelastomer is dispersed in a polymer such as LLDPE copolymer of butene and ethylene. One example of such a material is Ampacet 10919 processing aid masterbatch available from AMPACET Corp.

In some applications it may be desirable to include in the polymer of one or more of the layers a slip/anti-block agent, particularly for layers produced from polymers having a density of less than 0.925 g/cc. Generally such materials are inorganic compounds. Some examples include mica, talc, silica, calcium carbonate, and the like. A typical example would be Ampacet 10430 slip/antiblock concentrate available from AMPACET Corp.

It is also within the scope of the present invention for the polyethylene used to produce the inventive films to contain various other additives normally included in polyethylenes, such as heat stabilizers, weather stabilizers, lubricants, etc, in amounts that do not impact unduly on the objects of the present invention. It is also within the scope of the present invention to blend the required narrow molecular weight polyethylene having a density of at least about 0.925 with other polymers so long as the amount of the other polymers does not unduly detract from the beneficial properties of the required polyethylene, i.e. low haze and good handling properties. Generally the required polyethylene is greater than about 50 weight percent of the polymer, more typically at least 90 weight percent of the polymer, and still more preferably at least about 99.5 weight percent of the polymer.

It is within the scope of the present invention to prepare single layer films having a haze of less than 17.8 using polyethylene having a density of at least 0.925 and a molecular weight distribution of no more than about 4. It is considered that such films can be produced by casting, blowing, or extrusion.

It is also within the scope of the present invention to use such a layer of film to form a multilayered film. The polymers employed in the other layers can be selected from generally any of the polymeric materials generally used in producing films. Thus the other layers need not be limited to polymers of ethylene but could contain other polymers such as propylene-butene copolymer, poly(butene-1), styrene-acrylonitrile resin, acrylonitrile-butadiene-styrene resin, polypropylene, ethylene vinyl acetate resin, polyvinylchloride resin, poly(4-methyl-1-pentene), and the like. Multilayers can be formed using techniques generally known in the art such as, for example co-extrusion.

One particularly preferred example of a multilayered film includes one layer having a percent haze of less than 17.8 comprising a polyethylene having a density in the range of about 0.925 to about 0.945 g/cc and a molecular weight distribution of no more than 4 and another layer comprising a second polyethylene having a molecular weight distribution greater than 4, more preferably greater than 6, and still more preferably greater than 10, such as polyethylenes produced using Phillips chromium catalysts or Ziegler-Natta type catalysts.

For some applications it is also desirable for the polyethylene with the broader molecular weight distribution to have a higher density than the polyethylene having the narrower molecular weight distribution, for example a density of at least about 0.945 g/cc. In a preferred embodiment of this type there are at least three layers and the outer layers have a haze of less than 17.8 percent and comprise a polyethylene having a density in the range of about 0.925 to about 0.945 g/cc and a molecular weight distribution of no more than 4, and and the inner layer comprises a polyethylene having a density of at least about 0.945 g/cc.

In another preferred embodiment there are at least three layers and the outer layers have a haze of less than 17.8 percent and consists essentially of polyethylene having a density in the range of about 0.925 to about 0.945 g/cc and a molecular weight distribution of no more than 4, and and the inner layer comprises polyethylene having a molecular weight distribution of at least 10 and a density of less than 0.93 g/cc, most preferably a density in the range of 0.91 to 0.929 g/cc with a HLMI in the range of about 12 to about 24 dg/min.

The most preferred multilayered films are those in which the multilayered film itself has a percent haze of less than 17.8, even more preferably a percent haze of less than 10. In the currently preferred three layer film the outer layers each have a thickness in the range of about 5 to about 25 percent of the total thickness of the three layered film. A particularly preferred inner layer is one having a thickness equal to about 50 to about 90 percent of the total thickness of the three layered film, with the polymer of that inner layer being a low density linear copolymer of ethylene and 1-hexene produced using a Phillips Cr catalyst in a particle form polymerization process, particularly a copolymer having a density in range of about 0.91 to about 0.929 g/cc, an HLMI in the range of about 12 to 24 dg/min. and a molecular weight distribution greater than 10.

It is also within the scope of the present inventive mutilayered films to have a layer of polyethylene having a broader molecular weight distribution and a lower density than the polyethylene in the layer having a percent haze of less than 17.8, for example one layer could have a percent haze of less than 17.8 and be composed of a polyethylene having a density at least 0.925 g/cc and molecular weight distribution of at least 4 and a second layer could be composed of a polyethylene having a density of less than 0.925g/cc, such as for example a low density polyethylene produced by a high pressure process.

It is also within the scope of the present invention to have a multilayered film in which one layer has a percent haze of less than 17.8 wherein the polymer consists essentially of a polyethylene having a density of at least 0.925 g/cc and a molecular weight distribution of less than 4 and another layer composed of a low density polyethylene having a narrow molecular weight distribution and good clarity. In that case the inventive layer of polyethylene provides stiffness that may not be provided by the lower density polyethylene without detracting from the clarity of the lower density polyethylene as much as would a similar density polymer produced by a Phillips chromium catatalyst or a Ziegler-Natta type titanium-containing coordination catalyst.

A layer having a percent haze of less 17.8 made of a polyethylene having a density of less than 0.935 g/cc typically has a much lower melting point than polymers of the same density and molecular weight produced by conventional transition metal coordination catalysts or Phillips chromium catalysts. If a lower melt temperature layer is desired it may therefor be advantageous to use the polyethylenes having a density in the range of 0.925 to 0.935 g/cc and a molecular weight distribution of less than 4 to form the layer having the haze of less than 17.8.

In a particularly preferred embodiment all the polyethylene layers are polyethylenes produced using metallocene catalysts which have molecular weight distributions of less than 4.

A further understanding of the present invention and its objects and advantages will be provided by the following examples.

EXAMPLES

Example I

A large batch of solid particulate metallocene-based catalyst was prepared. The preparation involves reacting the metallocene (but-3-enyl) (cyclopentadienyl) (fluorenyl) (methyl) methane zirconium dichloride which is also known as (5-cyclopentadenyl) (5-fluorenyl) hex-1-ene zirconium dichloride with a 10 weight percent solution of methylaluminoxane in toluene to give a soluble olefin polymerization catalyst system. Davison 948 silica, dried thermally and treated with trimethylaluminum, was added to the liquid catalyst system. To heterogenize this system the terminal unsaturated group of the metallocene was copolymerized with ethylene by adding ethylene to maintain a pressure in the reaction vessel at 3 to 4 psig and stirring while the temperature was maintained at about 20° C. After about two hours, the ethylene addition was stopped and the slurry was filtered. The solid was washed with toluene and then with hexane and dried overnight using a membrane pump until no more solvent appeared on the condenser. The resulting pink powder was dried an additional 5 hours in a high vacuum. The solid was sieved through a 60 mesh screen and combined with Cabosil HS-5, a fumed silica which had been dried thermally and treated with trimethylaluminum.

The resulting solid metallocene-based catalyst system was then employed in a pilot plant scale continuous loop reactor under slurry type polymerization conditions. The feedstocks to the reactor were passed through alumina drier beds prior to being sent to the reactor. The reactor was a stainless steel pipe loop reactor. Circulation was achieved by a propeller within the reactor. Reactant concentrations were monitored by flash gas analysis using two on-line gas chromatographs.

The polymerizations were conducted in isobutane as a liquid diluent using varying amounts of ethylene and hexene-1 comonomer to obtain a number of lots of polyethylene fluff. Copolymers of ethylene and hexene-1 having densities varying from 0.9179 to 0.9402 g/cc were produced using the solid metallocene based catalyst system. The polyethylene copolymers of various densities were compounded with a typical stabilization package comprising 0.06 weight percent Irganox 1010, 0.12 weight percent PEP-Q, and 0.05 weight percent zinc stearate based upon the weight of the polymer.

The resulting polymers were then evaluated for various physical properties and were employed in the production of films using a 4 inch Sano blown film line having a 1.5 inch single screw extruder. The film die is a spiral mandrel die with four entry ports and is 4 inches in diameter. The die had a dual lip air ring mounted on it which was used to cool and stabilize the extruded bubble. Film blowing parameters were employed that are typical of linear-low density polyethylene type processing conditions, including a 0.06 inch die gap, 190° C. extruder barrel and film die set temperatures, 2.5:1 blowup ratio, no stalk, i.e. "in-pocket extrusion" in 1 mil film thickness. The screw rotation was adjusted to keep the extrusion rate between 55 and 60 pounds per hour, so that the film properties so obtained would scale directly (i.e., be the same as or at least very similar) with those obtained from larger, commercial scale equipment.

For some of the polyethylene copolymers runs were also made where the copolymer had been compounded with 0.07 weight percent of FX-9613 fluoropolymer. As controls films were also produced using the commercially available Dow 2045A copolymer, which is believed to be a linear low density polyethylene copolymer produced using a non-metallocene titanium-based catalyst system. Also, films were made using a copolymer produced by a Phillips chrome resin.

Various characteristics of the polymer and the polymerization were characterized. Examples of characteristics determined in various cases include Haze (ASTM D-1003 using an XL-211 Hazeguard System from Garder/Neotec Instruments Division); density in grams/mL (ASTM D1505-68); High Load Melt Index (HLMI) in grams of polymer/10 minutes 190° C. (ASTM D1238-86, Condition 190/21.6); Melt Index (MI) in grams of polymer/10 minutes 190° C. (ASTM D1238-86, Condition 190/2.16); Shear Stress Response (SR) determined by dividing HLMI by MI; Molecular weights by size exclusion chromatography, i.e. weight averge molecular weight referred to herein as $M_w$ and number average molecular weight referred to herein as $M_n$; and Heterogenity index (HI) or molecular weight distribution (MWD) being determined by dividing $M_w$ by $M_n$. The (SEC) size exclusion chromatography was conducted using a linear column capable of resolving the wide range of molecular weights generally observed in polyolefins, such as polyethylene.

The property referred to herein as flow-activation energy, also sometimes referred to as energy of activation, i.e. Ea, reflects the sensitivity of a polymer melt viscosity to temperature. This is generally viewed as a function of the linear vs network character of the polymer. The molecular weight and the molecular weight distribution are also generally viewed as factors affecting the flow activation energy. The Ea in terms of kJ/mol can be readily determined from data obtained from a dynamic rheometer such as Rheometrics Inc. (RMS 800) dynamic rheometer. A standard prescription for summarizing the viscosity-temperature dependence of polymer melts has long been available in the scheme known as the Williams-Landel-Ferry (WLF) superposition which is described in the classic text entitled "Viscoelastic Properties of Polymers", 3rd Edition (John Wiley & Sons, New York, 1980) by John D. Ferry. Data needed for establishing the temperature dependence of dynamic viscosity versus frequency, or viscosity vs shear rate, are not difficult to obtain at various temperatures in a range between melting and the onset of chemical degradation. In order to ensure that the Ea values are most accurate, it is desirable to optimize the data to produce optimally smooth isothermal master curves according to the WLF time-temperature superposition but using a least squares closeness-of-fit criterion based on Carreau-Yasuda model parameters that have been shown previously to give highly precise fits to single temperature polyethylene data. This can be done in various ways. The currently preferred technique involves subjecting the dynamic viscosity frequency curves obtained from a Rheometrics, Inc. dynamic viscometer to a proprietary computer program entitled "Rheology Analysis Program CY" covered by Phillips Petroleum Company unpublished copyright which was filed for registration on Jan. 31, 1995. This proprietary computer program is available for use by others under a licensing program.

Discussions of the Carreau-Yasuada model can be found in *Dynamics of Polymeric Liquids,* Second ed. (John Wiley & Sons, New York, 1987) by R. Byron Bird, Robert C. Armstrong, and Ole Hassager; as well in C. A. Hieber and H. H. Chiang, "Some correlations involving the shear viscosity of polystryrene melts," *Rheol. Acta,* 28, 321–332 (1989) and C. A. Hieber and H. H. Chiang, Shear-rate-dependence modeling of polymer melt viscosity," *Polym. Eng. Sci.* 32, 031–938 (1992).

The copolymers produced using the metallocene-based catalyst system have some distinct differences from the Dow 2045A polymer and the polymer produced using a Phillips chromium catalyst. Specifically, the polymers produced using a metallocene-based catalyst had molecular weight distributions in a range of 2.17 to 2.31 and unusually low melting points for their density. The Dow polymer had a broader molecular weight distribution. The polymer produced using a Phillips chromium catalyst a molecular weight distribution that was even broader than that of the Dow polymer. In addition, the SR or HLMI/MI for the polymers produced using the metallocene-based catalyst were in the range of 17 to 18 whereas the Dow resin was 30. From rheological data and Carreau-Yasuda parameters at 190° C., the flow activation energies of the polymers were compared. The polymers produced from the metallocene-based system had flow activation energies in the range of 20.48, to 23.71 kJ/mol. The Dow 2045A polymer in contrast had a flow activation energy, Ea, of 25.47 kJ/mol. The metallocene-based polymers were also evaluated to determine the concentration of terminal vinyl groups. The percent of chains with a terminal vinyl were in the range of 30 to about 42.9 percent, a value of which is somewhat lower than that normally observed for copolymers produced using chromium type catalysts. Carbon $^{13}$NMR analysis also indicated that the metallocene-based polymers showed the evidence of trace amounts of ethyl and butyl short chain branches which may have come from in-situ generated one olefin oligomers. As determined by FTIR spectroscopy, the total branching of the metallocene produced resins varied from about 0.4 to about 2.1 mole percent. The number of vinyl groups per 1000 carbon atoms for the metallocene based resins as determined by FTIR was in the range of 0.087 to 0.145.

A summary of the polyethylene properties and the properties of selected films is shown in the following table.

| | Polyethylene Properties | | | Film Properties | | | | |
|---|---|---|---|---|---|---|---|---|
| | | | | MD | TD | | | |
| Film | Density g/cc | MI | MWD | Dart, g | Tear, g | Tear, g | Haze, % | Gloss, % |
| 1A | 0.9179 | 1.06 | 2.17 | 388 | 200 | 398 | 4.06 | 119.7 |
| 1B | 0.9179 | 1.06 | 2.17 | 708 | 299 | 429 | 3.73 | 134.3 |
| 2A | 0.9216 | 1.36 | 2.24 | 169 | 237 | 411 | 5.9 | 111.5 |
| 3A | 0.9222 | 1.89 | 2.21 | 256 | 253 | 429 | — | — |
| 3B | 0.9222 | 1.89 | 2.21 | 145 | 174 | 453 | 5.66 | 118.2 |
| 4A | 0.9256 | 0.98 | 2.31 | 153 | 170 | 422 | — | — |
| 4B | 0.9256 | 0.98 | 2.31 | 152 | 222 | 355 | — | — |
| 5A | 0.9402 | 0.87 | 2.31 | 30 | 19 | 147 | — | — |
| 5B | 0.9402 | 0.87 | 2.31 | <30 | 24 | 168 | 5.74 | 121.4 |
| Dow 2045 | 0.9200 | 1.00 | 4.17 | 216 | 461 | 755 | 17.8 | — |
| Cr Resin | 0.9230 | — | 24.0 | — | — | — | 27.08 | 30 |

In the above table if there is an A after the film number, it refers to a film prepared without any fluoroelastomer, whereas if there is a B after the number, it refers to a film produced using a polymer containing 0.07 weight percent fluoroelastomer. No fluoroelastomer was used in the control runs where films were produced from the Dow resin and the Phillips chromium resin.

The table demonstrates that in some cases the addition of fluoropolymer improved the dart impact strength. It is important to note that the polymer films remained relatively clear even with a metallocene-based polymer having a density as high as 0.9402 g/cc. The film from the 0.9402 g/cc density metallocene based resin was much clearer and smoother than the film of the resin with lower density that was produced with a Phillips chromium catalyst. While the metallocene resin having a density of 0.9402 g/cc had somewhat lower values for dart impact and tear resistance, the fact still remains that the copolymer produced using the metallocene is capable of producing very clear films at densities much higher than that normally employed in making films. In addition films made from the higher density resins have the additional property of greater stiffness than the films made from lower density polymer, a definite advantage in some applications.

It was further noticed that the films produced from the lower density metallocene based resins, i.e. those having a density of less than 0.925 g/cc exhibited significant friction in the wooden take-up slats. In addition, the tackiness and blocking decreased as resin density increased. Accordingly, for the best balance of processing and clarity properties, the metallocene produced resins having a density of at least about 0.925 g/cc were preferable. Additional runs were made that demonstrated that it was possible to produce 0.5 mil films using the special polyethylene copolymers having a density of at least about 0.925 g/cc and a narrow molecular weight distribution.

Example II

A coextruded blown film having three layers was produced using a medium density metallocene prepared using the same type of catalyst system described in Example I and a low density linear polyethylene produced using a Phillips chromium catalyst process. Both ethylenes were copolymers of ethylene and 1-hexene. The medium density metallocene-produced polymer had a density of 0.9309 g/cc and a melt index of 0.87 dg/min. The low density linear polyethylene produced with the Phillips chromium catalyst process had a density in the range of 0.919 to 0.923 and a HLMI in the range of 15 to 21 dg/min. If one produced a 1 mil film using the chromium low density linear polyethylene, it is possible to obtain good physical properties, however, the optical properties are less than would be desirable for clear film applications, i.e. the percent haze is greater than 17.8 in such a film. A 1 mil film produced using the metallocene catalyst system had lower tear resistance than the low density linear polyethylene produced using the chromium catalyst. The 1.5 mil coextruded film was extruded using a Sano coextrusion dye. Processing parameters included 3.0:1 blow up ratio, 0.060 inch die gap at 200 lb/hour rate. The bubble configuration was "pocket". The process was carried out to produce a product in which 60 percent of the thickness was the low density linear polyethylene and the two outer layers each were 20 percent of the thickness, the two outer layers being the metallocene polyethylene. The metallocene polyethylene was compounded with 1 weight percent of Ampacet 10919, which is believed to be a butene-ethylene linear low density polyethylene containing about 3 weight percent of the fluoroelastomer processing aid. A comparison of various properties of approximately 1 mil films of each of the two resins and of the 1.58 mil coextruded film are set forth in the following table.

Comparison of Films

| Property Tested | Coextruded | Cr Polymer | Metallocene Polymer |
| --- | --- | --- | --- |
| Gauge mil | 1.58 | 1.01 | 1.08 |
| E. Tear MD g | 101 | 103 | 58 |
| E. Tear TD g | 685 | 323 | 272 |
| T.E.D.D. ft-lbs | 1.23 | 1.45 | 0.886 |
| Dart g | 96 | 216 | 110 |
| Ten. @ Yield Md psi | 1800 | — | 2150 |

-continued

Comparison of Films

| Property Tested | Coextruded | Cr Polymer | Metallocene Polymer |
| --- | --- | --- | --- |
| Ten. @ Yield TD psi | 1850 | — | 2300 |
| Ten. @ Break MD psi | 4450 | — | 3750 |
| Ten. @ Break TD psi | 4350 | — | 4150 |
| Elongation MD % | 517 | — | 506 |
| Elongation TD % | 723 | — | 630 |
| Haze — | 7.4 | >17.8 | 4.4 |
| Gloss — | 115.6 | — | 129 |

The data shows that the coextruded film has improved optical properties as compared to the low density linear chromium based polyethylene and improved properties in toughness as compared to the films made only from the metallocene polymer. Of particular note is the fact that the haze of the coextruded film is significantly lower than that of the polymer of the inner layer.

That which is claimed:

1. A self-supporting film consisting of a single low haze layer having a percent haze of less than 10% wherein the polymer consists essentially of polyethylene, optionally containing a fluoroelastomer, a density of at least 0.93 g/cc, and a molecular weight distribution of no more than 4, said polyethylene being further characterized by being substantially free of branches having six or more carbon atoms.

2. A film according to claim 1 wherein the polyethylene has a molecular weight distribution of no more than about 3.

3. A film according to claim 2 wherein the polyethylene used to produce said film has a density of at least about 0.94 g/cc.

4. A film according to claim 2 which is a blown film.

5. A film according to claim 4 having a thickness in the range of about 0.25 to about 5 mils.

6. A film according to claim 5 wherein the polyethylene contains ethyl branches and butyl branches.

7. A film according to claim 6 wherein the polyethylene has a density in the range of about 0.94 to about 0.945 g/cc.

8. A film according to claim 7 wherein the polyethylene used to produce the film has a molecular weight distribution of at least about 1.5.

9. A film according to claim 8 wherein the polyethylene has a melt index in the range of about 0.2 to about 5 dg/min.

10. A film according to claim 9 wherein the polyethylene has a shear stress response value in the range of about 16 to about 20.

11. A film according to claim 10 wherein the polyethylene has a critical shear stress at the onset of melt fracture of less than $4 \times 10^6$ dyne/cm$^2$.

12. A film according to claim 11 wherein at least about 20 percent of the polymer chains of the polyethylene contain terminal vinyl groups.

13. A film according to claim 1 wherein the polyethylene has ethyl branches which are uniformly distributed at the intermolecular level.

14. A film according to claim 13 wherein the polyethylene is produced by the homopolymerization of ethylene in the presence of an alkane liquid diluent under slurry polymerization conditions using a catalyst consisting essentially of the solid catalyst prepared by (a) combining 5-(9-fluorenyl)-5-(cyclopentadienyl)-hexene-1 zirconium dichloride and methylaluminoxane in a liquid, (b) prepolymerizing ethylene in the resulting liquid, and (c) separating the resulting solid prepolymerized catalyst system from the liquid.

15. A film according to claim 1 wherein the polymer employed in making the low haze layer has a melt index of at least about 2 dg/min and does not contain any fluoroelastomer.

16. A film according to claim 1 wherein the polyethylene used in forming the film has a melt index of less than 2 dg/min and contains a processing enhancing amount of fluoroelastomer.

17. A film according to claim 1 wherein the polyethylene used in forming the film has a melt index of less than 2 dg/min and contains about 0.01 to about 1 weight percent fluoroelastomer based on the weight of the polyethylene in said layer.

18. A film according to claim 1 wherein the polyethylene is prepared by polymerizing ethylene and hexene in the presence of an alkane liquid diluent under slurry polymerization conditions using a catalyst consisting essentially of the solid catalyst prepared by (a) combining 5-(9-fluorenyl)-5-(cyclopentadienyl)-hexene-1 zirconium dichloride and methylaluminoxane in a liquid, (b) prepolymerizing ethylene in the resulting liquid, and (c) separating the resulting solid prepolymerized catalyst system from the liquid.

19. A low haze self-supporting film wherein the polymer consists essentially of polyethylene, optionally containing a fluoroelastomer, said polyethylene having a density of at least about 0.93 g/cc, a MWD of no more than 4, and ethyl branches which are uniformly distributed at the intermolecular level, said polyethylene being further characterized by being substantially free of branches having 6 or more carbon atoms.

20. A film according to claim 19 wherein the polyethylene also has butyl branches.

* * * * *